United States Patent [19]

Lehrmann

[11] Patent Number: 5,181,617
[45] Date of Patent: Jan. 26, 1993

[54] METHOD AND APPARATUS FOR SEPARATING AT LEAST A FRACTION FROM A MIXTURE CONTAINING RECLAIMABLE MATERIALS

[75] Inventor: Falko Lehrmann, Tönisvorst, Fed. Rep. of Germany

[73] Assignee: Buehler AG, Uzwil, Switzerland

[21] Appl. No.: 587,343

[22] Filed: Sep. 24, 1990

Related U.S. Application Data

[63] Continuation-in-part of Ser. No. 545,771, Jun. 28, 1990, abandoned, which is a continuation of Ser. No. 301,556, Jan. 23, 1989, abandoned.

[30] Foreign Application Priority Data

Jan. 22, 1988 [CH] Switzerland .................. 00218/83

[51] Int. Cl.⁵ .................................. B07B 9/00
[52] U.S. Cl. .................................. 209/31; 209/2; 209/37
[58] Field of Search .................. 209/2, 30–37, 209/284, 930, 23, 26, 27, 28, 29

[56] References Cited

U.S. PATENT DOCUMENTS

| | | | |
|---|---|---|---|
| 162,158 | 4/1875 | Downton | 209/37 |
| 461,789 | 10/1891 | Winchell . | |
| 508,611 | 11/1893 | Green | 209/23 |
| 2,695,221 | 11/1954 | Klugh et al. . | |
| 2,762,506 | 9/1956 | Fine | 209/27 |
| 3,360,125 | 12/1967 | Horsey | 209/31 X |
| 3,837,483 | 9/1974 | Noll | 209/30 |
| 3,897,215 | 7/1975 | Davidson et al. | 241/79.1 X |
| 3,929,628 | 12/1975 | Denevi et al. | 209/36 |
| 4,040,571 | 8/1977 | Lindeborg . | |

FOREIGN PATENT DOCUMENTS

| | | | |
|---|---|---|---|
| 0011592 | 11/1981 | European Pat. Off. . | |
| 0081539 | 8/1985 | European Pat. Off. . | |
| 0082815 | 5/1986 | European Pat. Off. . | |
| 0198945 | 10/1986 | European Pat. Off. | 209/30 |
| 54-40170 | 3/1979 | Japan | 209/930 |
| 2124928 | 2/1984 | United Kingdom | 209/33 |

*Primary Examiner*—Donald T. Hajec
*Attorney, Agent, or Firm*—McAulay Fisher Nissen Goldberg & Kiel

[57] ABSTRACT

Already ripened compost is subjected to a sifting process directly following a drum sieve. The duct conveying the flowing air is connected to the outside of the drum sieve and is thus fed with the material falling through the sieve. The duct is constructed as a sifter which separates a light fraction from a heavy fraction. At least one lock is arranged in the path along which the heavy fraction moves.

11 Claims, 4 Drawing Sheets

METHOD AND APPARATUS FOR SEPARATING AT LEAST A FRACTION FROM A MIXTURE CONTAINING RECLAIMABLE MATERIALS

CROSS REFERENCE TO RELATED APPLICATIONS

This is a continuation-in-part application of U.S. Ser. No. 545,771, filed June 28, 1990, now abandoned which is a continuation of U.S. Ser. No. 301,556, filed Jan. 23, 1989, now abandoned.

BACKGROUND OF THE PRESENT INVENTION

1. Field of the Invention

The invention relates to a method and apparatus for separating bio-refuse comprising a biological waste fraction and a plastic waste fraction into its constituent fractions, and to apparatus for carrying out this method.

2. Background Prior Art

A method of the above type is known from EP-PS 11 592. In this reference, an apparatus is used such as is already described in US-PS 2,695,221 for the processing of ores. In both cases, in addition to the sieving, the dust occurring in the sieve drum is also sucked away. In the case of EP-PS 11 952, this is effected in order to free refuse of non-compostable components before it is converted into compost. A hammer mill arranged in the drum also serves this purpose. In a known manner, this hammer mill carries out selective comminution, i.e. elastic components remain essentially uncomminuted, whereas brittle components are subjected to a very intensive comminuting action. In addition, a sieve section is also provided on this known drum for sieving out non-compostable components before the residue is composted.

In more recent times, it has been recognized that a much more effective separation of the refuse components is achieved if the constituent fractions of the refills are collected separately. The above-described known solution (EP-PS 11 592) suffers above all from the fact that far too many foreign components pass into the compost, and it is a known fact as described in the technical literature, that the compost obtained in this way is relatively rich in harmful substances.

However, the concept of separately collecting compostable material, in particular the so-called green waste from the garden and possibly also from the household (the most frequently used generic term is "bio-refuse"), still involves the problem that this refuse also contains various plastic components. The reasons for this are many and consist, on the one hand, in the fact that plastic components are carelessly thrown away and can then enter into the same fraction as the garden waste when the latter is collected with a rake; on the other hand, refuse sacks of plastic are usually used which are torn up by machine, so that the remaining portions of the sacks can also remain in the green refuse fraction. Household bio-refuse is also frequently not separated with sufficient care.

EP-PS 82 815 describes a method by which extensive removal of harmful components is possible from a compostable fraction. In this process—in the same way as in the prior art described above—refuse comprising a mixture of materials is sieved before further processing. This method is excellent for refuse mixtures and can naturally also be used for green waste in order to separate out the foreign components. However, as in all separating processes, a certain residual proportion of foreign materials will always occur in the compost.

Object of the Invention

The invention is intended to take a different route to solve the problem. The invention is based on a primary object of first leaving the foreign components in the reclaimable material mixture and then separating it out of the compost as completely as possible. This results in a method and apparatus which is as simple and effective as possible for its intended purpose.

This object is met by a method for separating a bio-refuse mixture having a biological compost fraction and a plastic waste fraction into its constituent fractions, wherein the biological compost fraction includes coarser material and finer material and wherein the plastic waste fraction also includes coarser plastic waste and finer plastic waste, in particular foil-shaped and leaf-shaped parts, the method comprising the steps of:

composting the bio-refuse mixture to produce a mature composted mixture having biological compost and plastic waste fractions;

sieving the composted mixture within a drum sieve to allow the fine plastic waste to sieve through; and sifting the sieved-through finer plastic waste with other light portions by means of a flowing gas.

Whereas, in the prior art, the gas flow is used solely for transport processes, in the present case, the energy which must in any case be expended for the movement of the gas is now also utilized for a sifting process and a substantially more effective separation is carried out.

When speaking of a "gas" this will generally be air, however, it has already been proposed to use steam when the nature of the gas is unimportant so far as the separating process is concerned. The fact that the method is carried out with compost which has already matured leaves open the possibility of doing away with a prior separation step, in particular sieving, wherein it is optionally possible to carry out such a sifting process if there is a particularly high degree of contamination of the raw product.

The procedure is simplified and the reentry of foreign substances is simultaneously precluded when the sifting step by means of a flowing gas is carried out directly following the sieving step without intermediate conveying. In this regard, performing the sieving step in at least two stages wherein the fine portions are separated off in the first stage avoids the need for intermediate conveying. This arrangement leads to trouble-free separation of the plastic components with a small expenditure of energy as will be seen from the later description.

Whereas, in the known embodiment, the interior of the sieve drum is subject to a suction, it has proved advisable for the composted material which as fallen through the sieve holes to be subjected to sifting and, in this way, the separation of foreign materials can be carried out much more thoroughly.

Although the method can be applied in principle to compost comprising different starting materials, in one form of the method, it is preferably formed from an already matured composted mixture which may contain, plastic foils and wood parts which are not decomposed.

it is advantageous, particularly when processing bio-refuse, but also in other cases, if this starting material is subjected to selective comminution prior to the rotting process. This is admittedly known per se, and it is likewise known, per se, that a selective comminution of this kind can be carried out e.g. by the application of blows, such as in a hammer mill, or by wet milling, e.g. in a drum mill; however, the combination with the measures of the present invention is particularly beneficial. In the case of the application of blows, the more brittle parts are comminuted to a greater degree than plastic parts such as plastic waste. In the case of wet milling, all materials having low wet strength, such as paper, are selectively comminuted to a greater degree than objects such as plastics which are hardly effected by moisture with respect to their strength. As will be explained later, a screw shredder is particularly suitable for the present process as a selective comminution device.

In accordance with the apparatus aspect of the present invention, an apparatus for separating at least one fraction from a mature, composted bio-refuse mixture having a biological compost fraction and a plastic waste fraction, comprises:

a drum sieve having an inlet end and an outlet end and sieving holes at its outer surface;

feeding means for introducing the mixture into the drum sieve;

a duct having an inlet connected to the outside surface of the drum sieve for receiving material sieved through the drum;

the duct being constructed as a means for sifting having at least one outlet for a light fraction and a further outlet for a heavy fraction;

means for providing a gas stream to the duct; and at least one lock means for the duct for providing sifting through the duct utilizing a recirculating gas flow;

whereby the gas flow causes at least finer particles of plastic waste and other lighter portions to be directed to the outlet for the light fraction.

Such apparatus is particularly suitable for carrying out the method of the invention as indicated above and also for carrying out other processes.

Similar apparatuses have admittedly already been proposed for the separation of granular material; however devices had to be provided for this purpose which fed the grains into the sifter in a relatively board downwardly raining veil in order to obtain a good separating action as a result of this veil. This had the disadvantage that relatively large quantities of air were then necessary in order to be able to carry out the separating process. But due to the fact that in the apparatus of the invention at least one lock is arranged in the path through which the heavy fraction moves, the looser material to be sifted can be brought into the sifter in this form—that is, without forming a veil—wherein the air guidance can be accurately controlled and adjusted on the one hand, and one can make do with relatively small quantities of air and accordingly with a lower consumption of energy.

Further advantageous embodiments of the invention are set forth in the appended claims. Further details of the invention are indicated with the aid of the following description of embodiment examples which are shown schematically in the drawing.

DESCRIPTION OF THE PREFERRED EMBODIMENTS

Figure 1A:
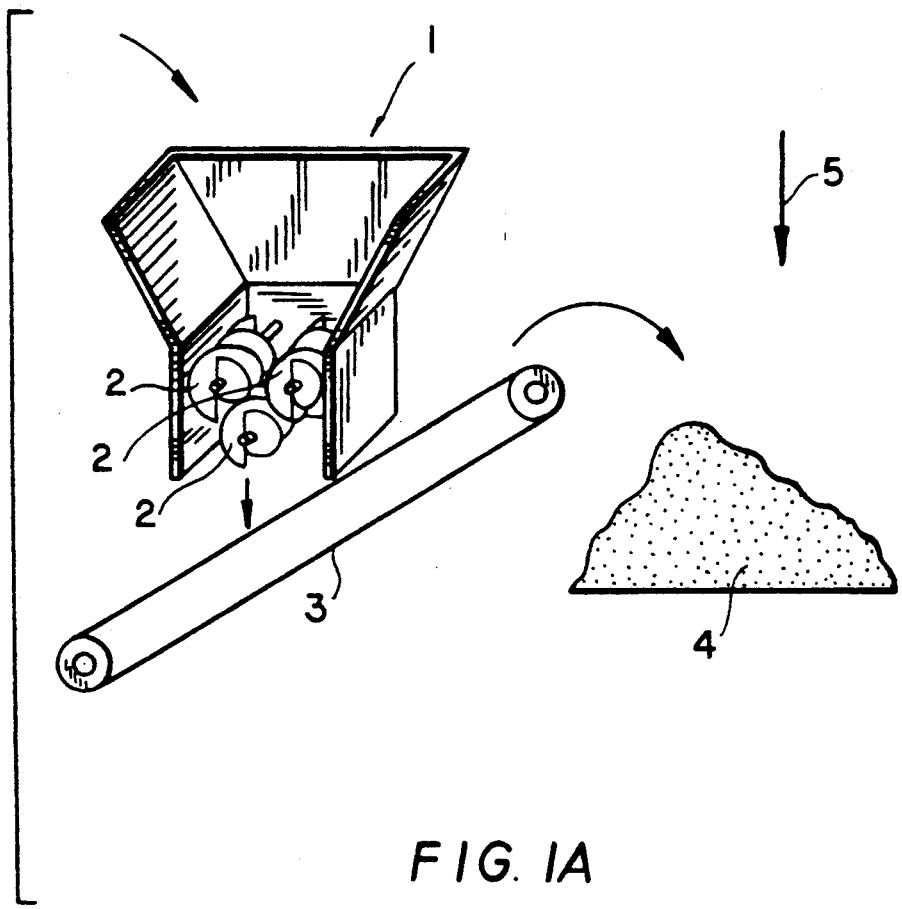
FIG. 1a shows a schematic view of a preparatory comminution process.

In a composting plant (FIG. 1), in particular for bio-refuse, (biodegradable waste) the coarse refuse components which arise (mainly branches and other wood components) are first comminuted. This is in contrast to the procedure with household refuse or municipal refuse which has not been sorted beforehand as proposed in EP-PS 82 815. The reason for this consists in that the prior sieving process proposed in the known arrangement in accordance with EP-PS 82 815 can be omitted when the refuse is sorted beforehand into a bio-refuse fraction. Since green waste can also contain foreign elements, in particular plastic waste, the comminution is preferably effected with the aid of a selective comminution device which customarily comminutes the plastic waste to a lesser degree than the rest of the material. A screw shredder 1 approximately of the kind proposed in US-PS 4,040,571, better still in accordance with US-PS 461,789 or EP-PS 81 539, is particularly suitable precisely for the processing of green waste. In the latter case (EP-PS 81 539) a shearing action is exerted on the introduced material between the adjacent screws 2 by means of different speeds (or even oppositely directed speeds) of the shredder screws 2 and the material is processed in this way into small pieces. In order to prevent the vertical passage of branches between two adjacent screws, a lower screw is preferably provided beneath an upper pair of screws, as shown in FIG. 1a; on the one hand, the lower screw prevents material from freely falling through between the upper screws and, on the other hand, contributes to the comminution, particularly of branches.

Figure 1B:
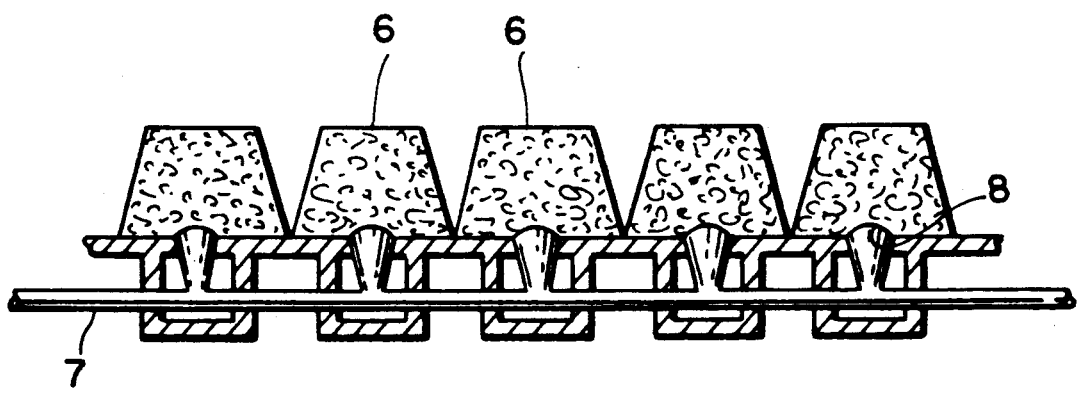
FIG. 1b shows a schematic view of the preparatory ventilated composting process.
Figure 1C:
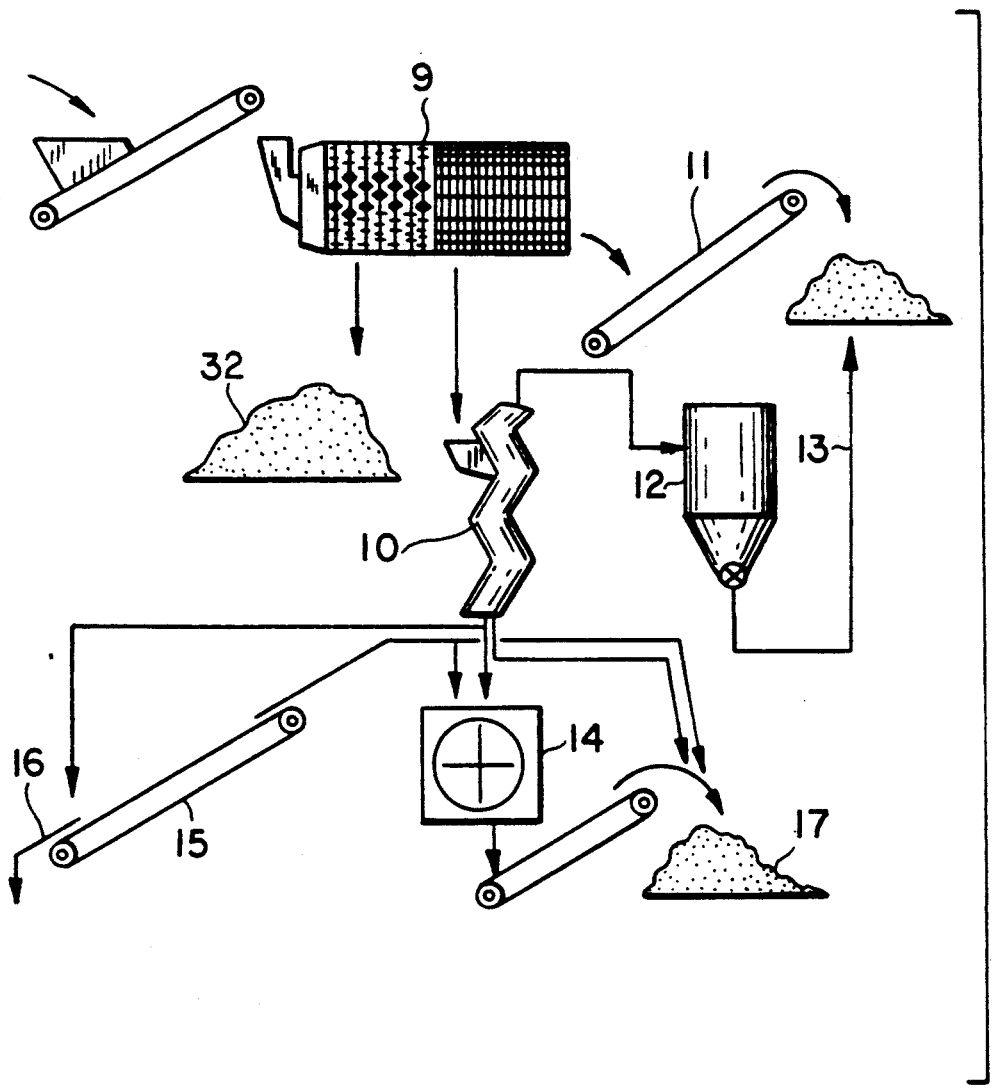
FIG. 1c shows a schematic view of one embodiment of the claimed separating apparatus.

The bio-refuse which has been comminuted in this way is then advisably brought by means of an appropriate conveyor device 3, constructed, per se, in any desired manner, to an intermediate store 4 where it is moistened by the addition of water or slurry in the sense of the arrow 5, whereupon—after prior mixing, if necessary - composting heaps 6 are established in a conventional manner (FIG. 1b). The refuse rots in these heaps 6 in a manner known per se, wherein a compulsory ventilation of the heaps 6 optionally takes place via tubular conduits 7, e.g. by sucking or blowing through sieve plates 8 which are embedded in the ground.

Since rotting further comminutes the decomposable waste components, while plastic components and other foreign components remain unaffected by the rotting process, it is easier to this extent to effectively separate out the latter foreign components. For this reason, a sieving process is carried out by means of a drum sieve 9 following the rotting stage, (FIG. 1c), with the sieving process optionally being carried out with the aid of a sieve drum 9 comprising a plurality of units having holes of different sizes, approximately corresponding to EP-PS 82 815. However, the use of a sieve drum according to this European patent is not absolutely essential.

Due to the sieving process by means of the sieve drum 9, the foreign components will generally be retained as sieving waste, which is facilitated on the one hand by the previous rotting process, but particularly when selective comminution is carried out beforehand. On the other hand, all fine components of the compost will already fall through in the first stage of the sieve (fine compost 32). Here a separation of dust can already be carried out by means of corresponding dimensioning of the hole sizes of a first sieve section (when using a drum sieve with a plurality of sieve sections having different hole sizes). However, it must be noted that an excessively fine sieve tends to become blocked easily.

As will become evident later, the separation of the fine compost 32 is particularly advisable, not only because the subsequent sifting (sifter 10, separator 12) is accordingly relieved of this, but also because in practice it is chiefly plastic foils which are separated off as the light fraction in the subsequent sifting process and the latter require no further separation step. However, if the first sieving section were to be omitted, fine compost would also be obtained in the light fraction during the sifting and this fine compost would then have to be removed again by sieving. This method is admittedly also practicable, but more energy is then required for sifting and sieving.

Hitherto, therefore, the dust occurring in the interior of the drum was sucked away. A portion of the dust fraction could accordingly be removed, but is self-evident that the remaining dust contained in the compost mass, and therefore not free-floating, could not be removed. For this reason, the energy required for sucking off dust is used more advantageously for operating a sifter which is arranged subsequent to the drum sieve 9 and works with the aid of flowing air. This sifter is shown only in a schematic manner in FIG. 1 and is preferably constructed as a deflection or vertical sifter, in particular as a zigzag wind sifter 10.

Whereas the sieving waste (mainly plastic waste) is e.g. transported away on a conveyor 11, e.g. in order to be reused in a reconvey plant for plastic, or to be taken subsequently to a dump, the light components are advisably separated by means of a separator, in particular a cyclone 12. If the sieve waste conveyed via the conveyor 11 is to be brought to a dump, the light material separated by the separator 12 (principally plastic foils, assuming the fine fraction has been separated beforehand via the first sieving stage of the drum sieve 9) can be added to this fraction, as is indicated by the arrow 13.

The heavy fraction emerging from the wind sifter 10 at its lower output is in many cases formed by wood components. Here the possibility exists of comminuting this fraction by means of a further comminution process, e.g. with the aid of a beater mill 14, in order to then add this fraction directly to the fine compost.

Another possibility is to mix the wood components into the raw compost before the latter is sifted into heaps 6 at the composting station. In the latter case the wood material serves as texture material which improves the access of air to the compost material in the heaps 6 in a manner known per se, while the wood material is simultaneously ultimately also broken down biologically as a result of passing through the rotting process again (or repeatedly). With conventional methods, a rotting time is required which is much longer than for the materials which can be broken down easily by rotting.

However, in the event that there are very many hard elements in the starting material, such as stones, it is advisable to provide a ballistic separator 15. This ballistic separator can be formed, e.g., by an appropriately constructed conveyor belt, the hard components bouncing off of the latter and taking the path indicated by the arrow 16, whereas softer components, in particular wood, are carried along and are then either used in an uncomminuted state as mulch material, or undergo multiple rotting as described above, or are fed to the hammer mill 14. In any event, a compost 17 which is cleaned with a low expenditure of energy and high degree of separation is obtained at the output of the system. This fine compost 17 can now be added to the fine compost 32 which has already been separated off in the first stage of the sieve 9.

It should be noted that a prior sieving step can also be effected in the sense of EP-PS 82 815 depending on the composition of the starting material, i.e., depending on the mixture of reclaimable materials formed by the supplied refuse, in order to keep the composting or rotting station for the heaps 6 free of large distributing materials. However, this prior sieving is not generally required The units 9 and 10 in FIG. 1 are now taken into consideration; in a customary arrangement (see also EP-PS 82 815) there is usually an additional energy consumption due to the intermediate positioning of corresponding conveyors between the sieve and the wind sifter 10. A conveyor of this kind not only has the disadvantage that it causes operating and investment costs, it also necessitates additional space and affects the course of the process in a somewhat favorable manner. This is because the material drops down at the outside of the drum sieve 9 in the form of a relatively thin veil, so that, in itself, it would already be in a form particularly suited for wind sifting. On the other hand, if the material is first guided over a conveyor, then precisely this thin veil is again comprised in a relatively compact mass.

It is precisely the presence of a thin veil at the outside of a drum sieve which previously led to the temptation to utilize this veil directly for the sifting process when sifting cereals and other granular material. Yet it is only necessary to bring to mind the large ratios relative to the length and breadth of the drum sieve 9 (floor surface) and the width of a wind sifter 10 to establish that the flow speed of the air flowing through the wind sifter 10 is considerably diminished on broadening the floor surface of a drum sieve 9, so that the sifting effect is again brought into question. Thus, mutually contradictory requirements arise here, on the one hand, for a loosening up of the material to the greatest possible degree and, on the other hand, for a flow speed of the sifting air which is as controlled as possible. As a rule, this sifting air will be air; however, it has already been proposed to use steam in order to achieve a certain balling together effect with thermoplastic materials.

Figure 3:
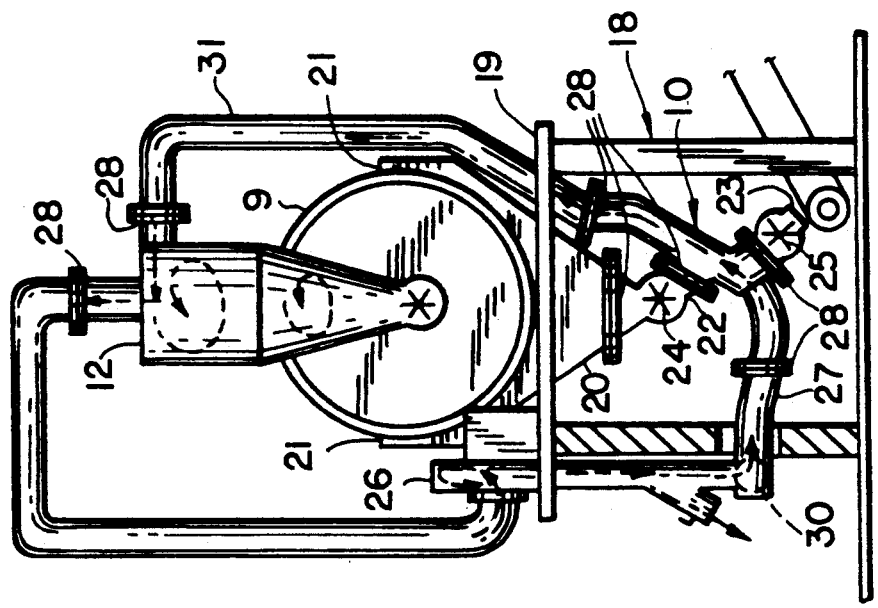
FIG. 3 shows an end view in the direction of the arrow III of FIG. 2.
Figure 2:
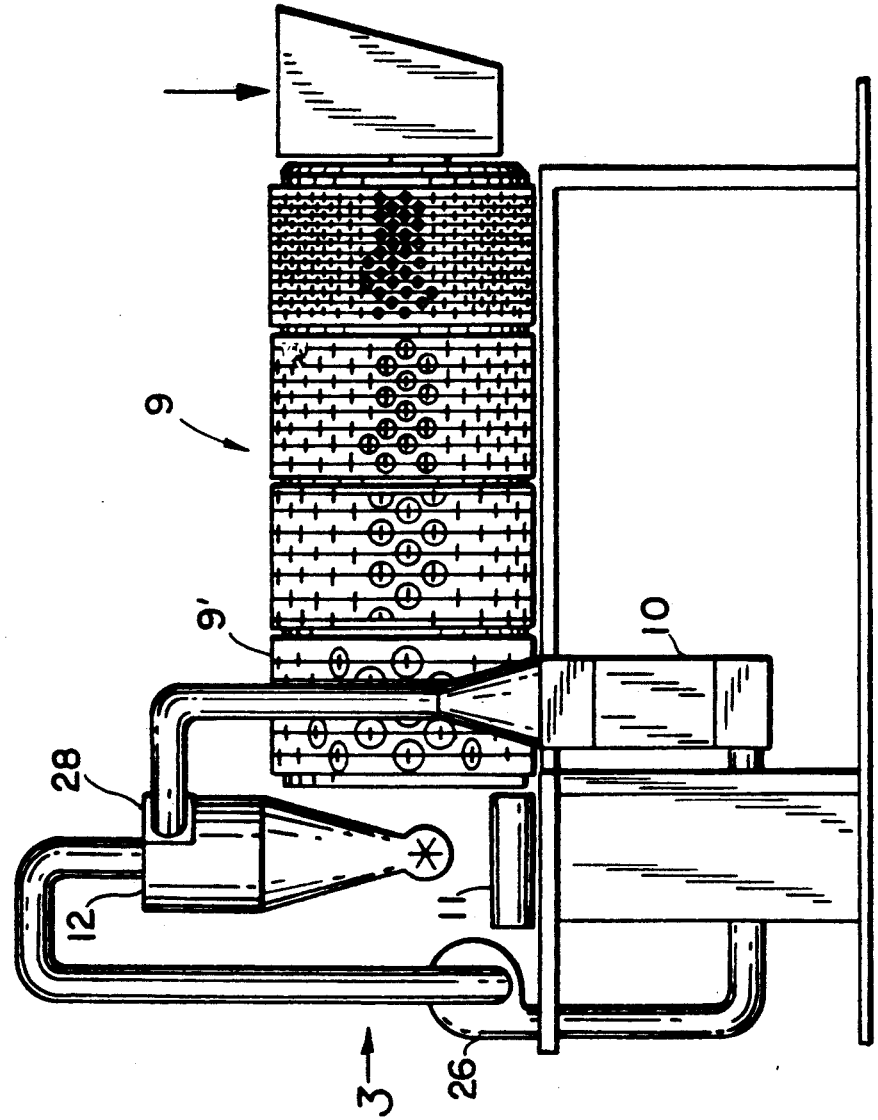
FIG. 2 shows an embodiment form of an apparatus of this kind seen in side view with the casing parts omitted.

However, the contradictory requirements described above are satisfied by an apparatus as shown in FIGS. 2 and 3. The latter show a sieve 9 with four different sieve sections having different hole sizes, although in fact any desired number of sieve sections can be used. However, if at least two such sieve sections are provided, it is advisable to provide the sifter 10 at least at the last sieve section 9' (as seen in the direction in which the material passes through).

The construction seen from FIGS. 2 and 3, which considerably economizes on space, has a support stage 18 for supporting the sieve drum 9. The support and drive are of a kind known per se and are thus not shown. Beneath the drum 9 and a platform 19 of the stage 18 there is located a catch funnel 20 for the material which falls through the sieve 9. This catch funnel 20 is advisably supplemented toward the top by a casing 21 which extends at least up to half the height of the sieve drum.

Whereas the relatively coarse foreign material, such as plastic waste, which remains through the rotting process, and possibly through the selective comminution in the mill 1, emerges as sieving waste at the end of the drum sieve 9 or emerges as sieving waste from the drum sieve 9 at the end of the last sieve section 9' and arrives on the conveyor 11 indicated in FIG. 2 (omitted in FIG. 3 for the sake of clarity), the material falling into the funnel 20 (FIG. 2) can still contain a light fraction of smaller plastic components, whereas the heavy fraction is generally formed by compostable material. Naturally, a collection container can simply be provided in place of the conveyor 11.

In this respect, reference is again made to EP-PS 82 815 for the purposes of which the apparatus shown in FIGS. 2 and 3 can likewise be used. If several such wind sifters 10 are then provided (compare FIG. 4), then the heavy fraction of the material emerging from one of the sieve sections can also comprise, e.g., combustible material and is thus suitable for the manufacture of fuel briquettes. In any event, the mixture emerging from the funnel 20 and containing the light fraction and the heavy fraction can enter into an inlet 22 of the wind sifter, wherein the heavy fraction leaves this wind sifter 10 again at an outlet 23.

In order to obtain controlled flow conditions and improve the separating action of the wind sifter 10, at least one lock 24 and/or 25 is provided in this path of the heavy fraction between the inlet 22 and the outlet 23, which lock 24 and/or 25 is preferably constructed as a rotary pocket lock or cellular wheel sluice. In this manner, it is ensured that the entry of secondary air is avoided, wherein it is ensured simultaneously in the case of the lock 24 that the material emerging from the drum jacket of the sieve 9 in a thin veil is not compacted to too great a degree, but is instead fed directly into the wind sifter 10.

The material mixture which is fed in this way via the inlet 22 is now effectively separated in the wind sifter 10, the heavy fraction emerging at the outlet 23, as was mentioned, whereas the light fraction is fed to the cyclone 12. The cyclone 12 is advisably arranged directly above the conveyor 11 carrying the sieving waste away from the sieve outlet, but, for reasons of space, preferably directly above the mouth of the sieve drum. In both cases, it can be seen that the cyclone is advisably arranged in the region of the mouth of the sieve drum.

In the cyclone 12, the light particles which are entrained by the air current in the wind sifter 10 are separated off, in particular the smaller plastic particles as a result of the prior sieving of the fine compost 32 (FIG. 1), and are deposited on the belt conveyor 11, whereas the cleaned air is drawn off by means of a blower 26. This blower is shown only schematically in FIG. 2 and advisably sits on the platform 19 in accordance with FIG. 3.

In this manner the cleaned air can easily be fed again into the wind sifter 10 via an inlet pipe 27 in recirculating operation, so that in any event any form of emission is avoided. It can be seen from the above explanation that the combination, according to the invention, provides a space-saving and energy-saving arrangement which is suitable for carrying out its separating task with a good degree of efficiency. Although the invention is described with reference to a specific embodiment of the wind sifter 10, it is evident that various sifter constructions operating with flowing air can be used in place of the sifter 10 and that, even when a wind sifter is used, different configuration are possible. This also applies in an analogous manner to the separator 12 which could also be realized in a different manner. For example, a filter separator could also be used; however a cyclone is simpler and less expensive.

A further advantage can be achieved in that the individual structural component parts, such as the locks 24 and 25, wind sifter 10 and cyclone 12, are connected with one another in a modular manner via detachable connection means 28. This also applies to the funnel 20. These detachable connection means 28 can be formed, e.g. as flange connections, as is indicated.

Figure 4:
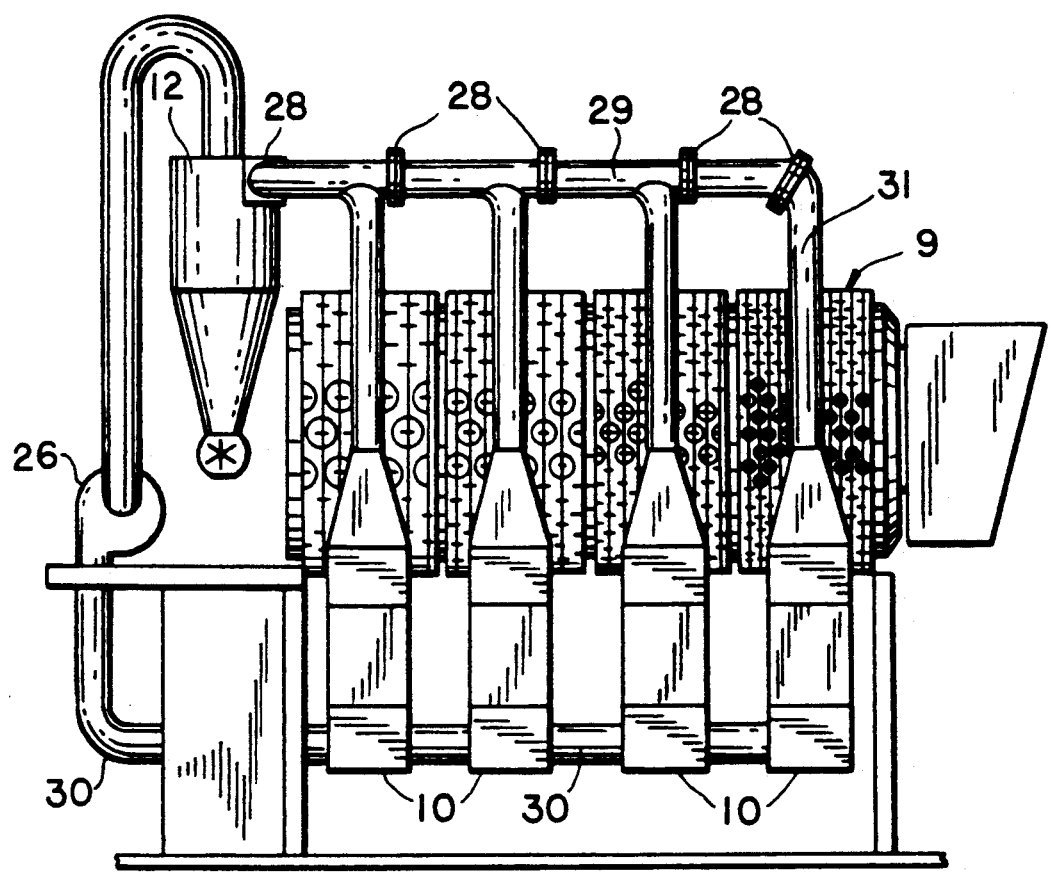
FIG. 4 shows a construction variant with a plurality of sifters in a view corresponding to FIG. 2.

It is possible in this manner to equip a single drum sieve 9 (which can itself consist in turn of a desired number of sieve sections) with a desired number of wind sifters 10, as can be seen with reference to FIG. 4. This ensures that identical flow conditions are provided in all sections. However, it is then advisable to connect all the wind sifters 10, via a collection line 29, to a common cyclone 12 or to feed all wood sifters 10 via a collection line 30, respectively. An adjustment valve can be provided optionally in at least one of these collection lines 29 and 30 and/or in the feed line 27 (FIG. 3) or discharge line 31 branching off from the latter, respectively, in order to adjust the flow conditions. If desired, such adjustment valves can be controlled via a flow meter (pressure, flow velocity and/or flow volume) in such a way that predetermined conditions prevail in all wind sifters 10, wherein the desired values depend on the material which is to be separated off in each case.

While the foregoing description and drawings represent the preferred embodiments of the present invention, it will be obvious to those skilled in the art that various changes and modifications may be made therein without departing from the true spirit and scope of the present invention.

What is claimed is:

1. An apparatus for separating a mature, composed bio-refuse mixture having a biological compost fraction and a plastic waste fraction, comprising:
   (a) a drum sieve having an inlet end, an outlet end, an outside surface, and sieving holes through said outside surface;
   (b) feeding means for delivering the mixture into said drum sieve;
   (c) sifting means comprising:
      (i) an inlet for receiving material sieved through said drum sieve, said inlet being connected to said outside surface;
      (ii) a first outlet for dispensing a light fraction; and,
      (iii) a second outlet for dispensing a heavy fraction;
      means for providing an isolated gas stream within said sifting means, said gas stream causing said light fraction to be directed to said first outlet;
      (v) ducts for interconnecting said inlet, said first and second outlets, and said means for providing an isolated gas stream, said ducts providing a pathway for said gas stream; and,
   (e) locking means for containing said gas stream within said ducts and preventing said stream from entering said drum sieve, said locking means located within said inlet of said sifting means.

2. The apparatus of claim 1, wherein said sifting means is constructed as a deflecting wind sifter.

3. The apparatus of claim 1, wherein said sifting means is constructed as a vertical sifter.

4. The apparatus of claim 1, wherein said sifting means is constructed as a zig-zag wind sifter.

5. The apparatus of claim 1 wherein said locking means is constructed as a rotary pocket lock.

6. The apparatus of claim 1, wherein said drum sieve comprises first and second sieve sections, said first sieve section having large hole sizes, and wherein said inlet is connected to said first sieve section.

7. The apparatus of claim 1, wherein said sifting means further comprises a cyclone separator, said cyclone separator connected to said gas providing means by said ducts.

8. The apparatus of claim 7, wherein said sifting means is constructed as a deflecting sifter.

9. The apparatus of claim 7, wherein said sieving holes are arranged in sections, each section being connected to corresponding sifting means, said cyclone separator being connected to said corresponding sifting means by a collecting line.

10. The apparatus of claim 7, wherein said locking means, said ducts, said sifting means and said cyclone separator are each enclosed within an individual housing, said housings being detachably connectable in a modular manner.

11. An apparatus for separating a mature, composted bio-refuse mixture having a biological compost fraction and a plastic waste fraction, comprising:

(a) a drum sieve having an inlet end, an outlet end, an outside surface, and sieving holes through said outside surface;

(b) feeding means for delivering the mixture into said drum sieve;

(c) sifting means comprising:
 (i) an inlet for receiving material sieved through said drum sieve, said inlet being connected to said outside surface;
 (ii) a first outlet for dispensing a light fraction; and,
 (iii) a second outlet for dispensing a heavy fraction;
 (iv) a cyclone separator, said cyclone separator being arranged near said outlet end of said drum sieve;
 (v) means for providing an isolated gas stream within said sifting means, said gas stream causing said light fraction to be directed to said first outlet; and,
 (vi) ducts for interconnecting said inlet, said first and second outlets, said cyclone separator and said means for providing an isolated gas stream, said ducts providing a pathway for said gas stream; and, (d) means for providing a gas stream within said ducts, said gas stream causing said light fraction to be directed to said first outlet;

(e) lock means for containing said gas stream within said ducts and preventing said stream from entering said drum sieve, said lock means located within said inlet of said sifting means; and, (f) a conveyor, said conveyor arranged leading away from said outlet end of said drum sieve, and said cyclone separator being arranged above said conveyor.

* * * * *